United States Patent
Carlson (10) Patent No.: US 8,584,443 B1
(45) Date of Patent: Nov. 19, 2013

(54) METHOD AND SYSTEM FOR CONTROLLING SOLID PROPELLANT THRUST

(75) Inventor: Russell W. Carlson, Cloverdale, CA (US)

(73) Assignee: Digital Solid State Propulsion, LLC, Reno, NV (US)

( * ) Notice: Subject to any disclaimer, the term of this patent is extended or adjusted under 35 U.S.C. 154(b) by 1246 days.

(21) Appl. No.: 12/561,233

(22) Filed: Sep. 16, 2009

Related U.S. Application Data (60) Provisional application No. 61/097,437, filed on Sep. 16, 2008.

(51) Int. Cl.
*F02K 9/00* (2006.01)

(52) U.S. Cl.
USPC .............................. 60/234; 60/253

(58) Field of Classification Search
USPC .................... 60/204, 233, 234, 235, 253, 254
See application file for complete search history.

(56) References Cited

U.S. PATENT DOCUMENTS

| | | | | |
|---|---|---|---|---|
| 3,701,256 | A * | 10/1972 | Pelham et al. | 60/39.47 |
| 6,412,275 | B1 * | 7/2002 | Perrucci | 60/204 |
| 7,788,900 | B2 * | 9/2010 | Dulligan et al. | 60/254 |
| 2006/0011276 | A1 * | 1/2006 | Grix et al. | 149/1 |
| 2008/0087003 | A1 * | 4/2008 | Dulligan et al. | 60/254 |
| 2008/0134924 | A1 | 6/2008 | Sawka | |

OTHER PUBLICATIONS

Malinovsky "History of Computer Science and Technology in Ukraine" (translation) Dec. 2002 paragraph 4 http://authors.library.caltech.edu/5456/1/hrst.mit.edu/hrs/apollo/soviet/essays/essay-krivonosov.htm[Feb. 19, 2013 12:54:37 PM].*

Sawka "Solid-State, On-demand Gas Generators as Pneumatic Batteries for Micro-Electronic Actuators and Fluid Delivery" NSTI-Nanotech 2006, www.nsti.org, ISBN 0-9767985-8-1 vol. 3, 2006 p. 306.*

Wayne N. Sawka and Charles Gris, ET Materials LLC, Rancho Cordova, CA; (SSC05-X1-3) 19th Annual AIAA/USU; Solid State Digital "Cluster Thrusters" For Small Satellites, Using High Performance Electrically controlled Extinguishable Solid Propellants (5 pgs).

Sawka, Wayne, "Digital Solid State Propulsion LLC", CleanTech, Santa Clara, CA, May 23-24, 2007, 2 pages.

Zimmermann, Joan, "Turning Off Explosions", Missile Defense Agency, TechUpdate, Spring, 2009, 1 page.

* cited by examiner

*Primary Examiner* — Phutthiwat Wongwian
*Assistant Examiner* — William Breazeal
(74) *Attorney, Agent, or Firm* — Morrison & Foerster LLP

(57) ABSTRACT

The present invention relates to a solid rocket motor control system that uses state of the art electrically ignited, extinguishable and throttleable propellants. In embodiments, the control system is implemented by a software algorithm embedded in missile flight controllers and contains all control system elements and control compensation that performs thrust control for many defense and space rocket motor applications, for example.

12 Claims, 6 Drawing Sheets

METHOD AND SYSTEM FOR CONTROLLING SOLID PROPELLANT THRUST

CROSS-REFERENCE TO RELATED APPLICATIONS

The present application claims priority to U.S. Prov. Appln. No. 61/097,437, filed Sep. 16, 2008, the contents of which are incorporated herein by reference in their entirety.

FIELD OF THE INVENTION

This invention resides in the field of propulsion systems, and in particular to systems that can freely control the amount thrust output from solid propellants.

BACKGROUND OF THE INVENTION

Solid propellants have numerous advantages over liquids for missile propulsion and as gas generators. Among these are greater safety in storage, handling, and transport, higher density, and simplicity of propellant packaging. Liquid propellants, however, have traditionally offered the huge advantage of ease of throttling and can be extinguished and reignited at will, thereby offering better energy management with minimal waste of on-board propulsive resources.

One application for this invention is in the Divert and Attitude Control Systems (DACS) for kinetic-kill missile warheads. DACS provide for control of vehicles flying outside the earth's atmosphere. Missile DACS typically use solid-propellant gas generators (SPGG) and pintle controlled nozzles to provide propulsive jets that accelerate and point the vehicle in the vacuum conditions of near-earth space. In the typical existing system, the gas generator is ignited at the start of the control period and continues to burn generally at a measured constant rate for the control duration. This is despite the fact that most of the gas is vented uselessly, because control is needed during only about 30% of the flight. As the flight time increases, the necessary control time remains essentially constant. This means that for longer flight times the wasted fuel increases to over 90%.

To mitigate this problem, the current state-of-the-art solid DACS utilizes pintle controlled nozzles. These pintle nozzles vary the size of their throat areas to collectively control the system chamber pressure thereby increasing or decreasing the burn rate of the propellant and hence the thrust. Pintle nozzles can also be used to extinguish the propellant, and thus save propellant. Unfortunately, pintle nozzles have several drawbacks: they add significant inert weight to a system with an already poor mass fraction, they reduce nozzle efficiencies thereby reducing performance, during the extinguishment event they create thrust spikes by opening the nozzle throats, and they can have significant thruster misalignment problems due to the necessity of their being mounted on the outside of the chamber.

Additionally, a pintle nozzle control system can only correct upon measured chamber pressure by varying the rocket motor throat area. Due to propellant ballistic burn rate errors at controlled pressures, resulting thrust has inherent inaccuracies that can only be corrected by the vehicle flight control system as measured through inertial sensors.

A need remains in the art, therefore, for a way to control a solid propulsion system that duplicates the ease of throttling and extinguishment and thrust accuracy of liquid propellants without the use of expensive, heavy and inefficient pintle nozzles. This capability would eliminate the biggest single deficiency of the solid-propellant systems and would have widespread system level improvements including: Mass fraction increasing, Performance Increase, Cost decrease and thrust accuracy increase.

SUMMARY OF THE INVENTION

The present invention relates to a solid rocket motor control system that uses state of the art electrically ignited, extinguishable and throttleable solid propellants. In embodiments, the control system is implemented by a software algorithm embedded in missile flight controllers and contains all control system elements and control compensation that performs thrust control for many defense and space rocket motor applications.

According to some aspects of the invention, the control system uses a closed loop algorithm to control the amount of electrical power applied to the solid propellants to cause them to output a desired amount of thrust. The result is rocket motor thrust varying proportionally with the propellant burn rate without using variable throat area pintle nozzles. Due to this, numerous improvements can be made to the future controllable solid rocket motor systems, including but not limited to: Rocket motor components are eliminated thus reducing the inert weight and increasing rocket motor mass fractions up to 60%; The controllable rocket motor is simplified thus reducing production cost by up to 50%; Overall rocket motor performance is increased due to the removing of pintle nozzles—Up to 20% performance increase in nozzle thrust efficiency results; Rocket motor thrust control is one to one with burn rate control improving thrust accuracy; Rocket motor ignition and extinguishment transients are improved and simplified by application and removal of electric voltage/current to perform rocket motor impulse control; the electrically controlled propellants inherently posses "Insensitive Munitions" capabilities that meet future defense requirements. These features are critical to ensure the propellant is safe for being deployed on fighter aircraft.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
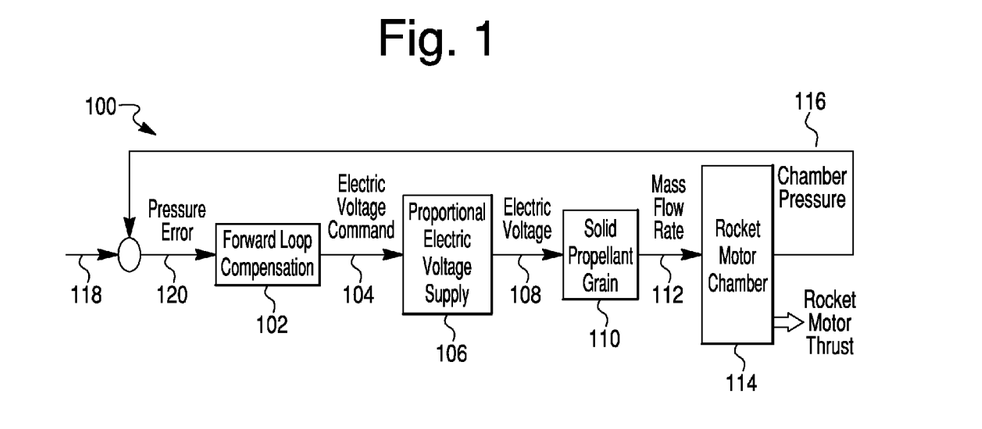
FIG. 1 is a functional block diagram of a control system according to embodiments of the invention.

A functional block diagram of an example control system 100 according to embodiments of the invention is shown in FIG. 1. As shown in FIG. 1, includes a series of functional blocks 102, 106, 110 to control rocket motor thrust from a rocket motor chamber 114 in response to a thrust command 118.

The functional blocks and related communications may best be described in connection with an exemplary operation of system 100. Upon rocket motor ignition, the system 100 commands all the propulsion system thrusters closed so that the propellant chamber 114 is completely closed off from the outside ambient environment (i.e. "Bomb" condition"). Chamber 114 and the associated thrusters and their control can be implemented by any of a wide variety of techniques known to those skilled in the rocket motor arts, such as direct drive hot gas or pilot operated valved on/off thrusters.

When the thrusters are closed, and depending on the thrust command 118 (which can be converted to a corresponding pressure needed in chamber 114 using a look-up table, for example, as described further below), the forward loop compensation block 102 provides electric voltage commands 104 to voltage supply block 106 so that the appropriate voltage 108 is provided to electrodes embedded in Electric Solid Propellant (ESP) 110 (e.g. solid propellants provided by Digital Solid State Propulsion Company of Reno, Nev.). These electrodes provide an electric potential across the propellant grain surface which initiates propellant burning (for example, as described in U.S. Patent Publ. No. 2008/0134924).

In embodiments, block 102 is implemented using software and associated program data, for example software running on an embedded CPU, SOC or similar computing apparatus, depending on the particular application, and executing a real time operating system. As such, the software ensures that chamber pressure stability criteria (phase and gain margins) are met. Those skilled in the art will recognize how to implement the invention in these and other computing environments after being taught by the present examples.

Proportional electrical voltage supply block 106 can be implemented by, for example, a direct current of pulse width modulated (PWM) voltage or current driver circuit implemented in electrical circuit hardware.

In general, system 100 thereafter monitors the chamber pressurization transient and commands one, or multiple thrusters to open (depending on allocation), when the desired chamber pressure (as indicated by signal 116) is reached. Due to inherent rapid pressurization transients, it is, in most cases, necessary to open the thruster(s) prior to the desired chamber pressure to avoid over-pressurization of the chamber 114.

System 100 also closes a pressure control loop during this ignition and pressurization transient. In embodiments, the logic for closing the pressure loop in loop compensation block 102 is configuration dependent and is a function of thruster pressurization transient rates and thruster response capabilities, as will be appreciated by those skilled in the art.

In embodiments, pressure loop compensation block 102 uses a Proportional, Integral and Differential (PID) control scheme that uses pressure error 120 gains to adjust voltage 108 against a pre-determined voltage bias level. Some applications do not require the Differential correction. In these case the differential gain is set to zero. The pre-determined voltage bias is the expected voltage 108 required to obtain the desired chamber 114 pressure. These values can be embedded in system 100, via a look-up table for example, and can be determined based on ballistic analysis and propellant burn rate characteristics, as will become more apparent from the example descriptions below.

The PID gain factors used by block 102 are determined based on conventional control stability analysis techniques such as, root locus and Nichols charting. They can be embedded in table look-up formats. Depending on application, the gain factors can be functions of commanded pressure or time. As propellant is expelled from the rocket motor chamber 114, the free volume increases and typically the relative stability of the system increases. In the PID scheme, gain factors are typically adjusted as a function of time, or as a function of propellant expelled from the chamber.

The closed loop system 100 maintains control of the system chamber 114 pressure. In embodiments, there are numerous non-linearities that occur in the rocket motor that the closed loop system compensates for during the rocket motor burn. Some of these non-linearities include: Throat area erosion, propellant burn area deviations and propellant burn rate deviations with bulk temperature.

During the pressure closed loop operation, the flight controller, or other user, can throttle the propulsion system thrust through the system command input 118. In embodiments, the system 100 algorithm, upon receipt of the command thrust, uses an embedded pre-determined pressure-thrust look-up table to determine the associated pressure command.

Upon receiving a new commanded thrust level 118, the forward loop compensation block 102 will use the new associated chamber pressure command to find the new commanded ESP voltage. This new voltage level is then processed through the closed loop PID compensation in block 102, and associated gain tables, to produce the appropriate command 104. Depending on the mission and configuration it may be necessary to close the thrusters during an increased pressure command to increase thrust response.

During the closed loop operation the flight controller, or other user, can command a total extinguishment of the thrust. Upon receipt of this command 118, block 102 provides a command 104 of 0.0 volts to be supplied to the propellant 110 which reduces the propellant burn rate to its lowest level, thereby reducing the chamber 114 pressure. Pressure is expelled through the open thruster(s). When pressure is bled down lower than the ESP burning threshold pressure then extinguishment occurs.

At the extinguishment state the system is ready for a re-ignition command. And the cycle described above can then be repeated.

Aspects of the invention will now be further described in an example application of controlling Electric Solid Propellants (ESP) in a new Electric Solid Divert and Attitude Control System DACS (ESDACS) design. Such ESDACS can be used, for example, in advanced Agile Kill Vehicles (AKVs). In general, this new DACS uses the control system 100 described above to deliver highly agile capability with multiple ignitions, extinguishment and throttling. Beneficial characteristics of this system include increased mass fraction (60%), increase performance (20%), decreased unit cost (50%) and inherent insensitive munitions (IM) with the use of ESPs.

The control of the ESP using the present invention contributes to the unique architecture of the new ESDACS. The algorithms of the invention are designed to capitalize on the inherent benefits of the new propellant technology. Example benefits of these new propellants are the ability to ignite, extinguish and throttle the burn rate with electric power applied directly to the propellant surface. The result is a 10:1 burn rate and thrust ESDACS throttling capability. Also, the propellant doesn't require a pyrogen igniter and is initiated via electric voltage. Propellant extinguishment is obtained when power is removed.

The ESP propellant also has inherent IM capability. Preliminary tests have shown the propellant to be insensitive to applied fuel flame, such as a propane torch. The same ESP can then be ignited via electric power. Due to these characteristics the ESDACS is an extremely safe propulsion system using ESP's.

Figure 2:
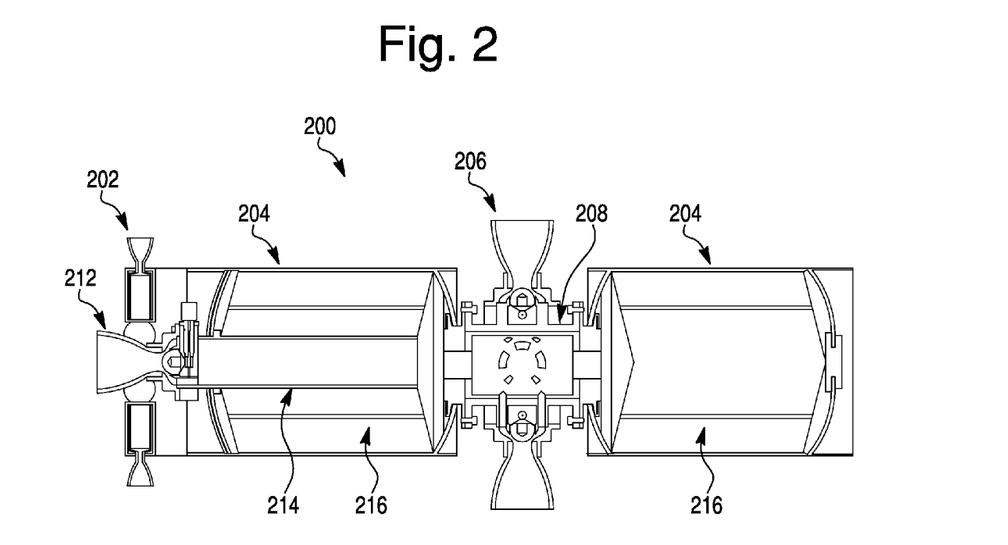
FIG. 2 is a layout diagram of an example application of the control system of the invention in an ESDACS.

An example layout of an ESDACS using the control system of the present invention is shown in FIG. 2. As shown, example ESDACS 200 includes six ACS on/off and throttling thrusters 202, one axial on/off thruster 212 and four on/off divert thrusters 206. ESDACS 200 further includes a thruster manifold 208, and axial thruster gas duct 214. The thrusters are fueled by solid propellant 216. The propellant is housed in motor case 204. These components will be described in more detail below. In this illustrated example, ESDACS 200 is about 21 inches long, about 8 inches in diameter, and weighs about 12.78 kilograms.

ESDACS 200 uses two conventionally fabricated insulated composite cases 204. These cases incorporate the electrode circuit features of the present control system invention that isolate the polarity of the electrodes. In embodiments, after installation of the electrodes the propellant is cast directly into the cases. Minimal propellant cast tooling is required to form the propellant surface after casting.

Figure 3:
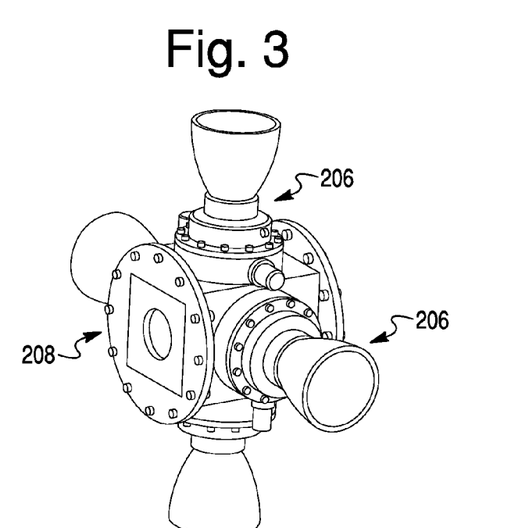
FIGS. 3 and 4 illustrate an example manifold for use with the ESDACS in FIG. 2.
Figure 4A:
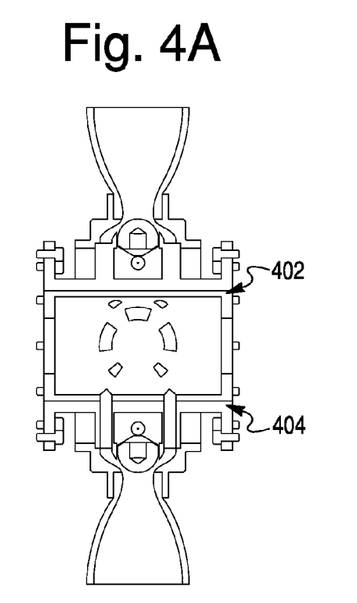
Figure 4B:
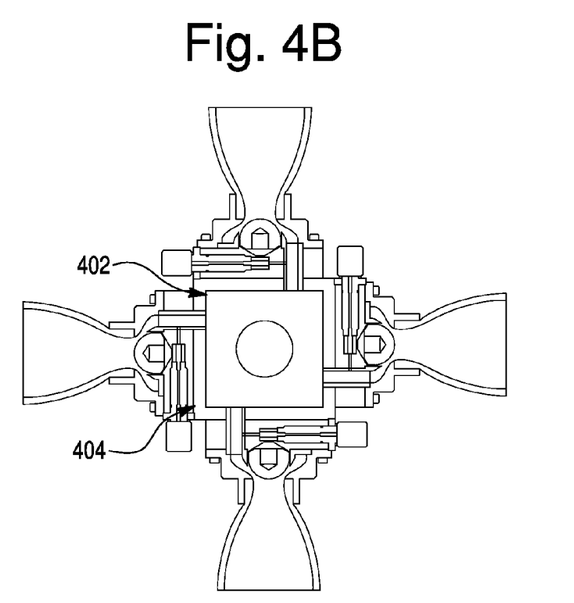

The ESDACS 200 includes a centrally insulated metallic manifold 208 that mounts all four divert thrusters 206. This manifold is made of high strength Titanium, for example, and conventionally insulated with hard composite insulation technology. FIG. 3 shows thruster manifold 208 with all four thrusters 206 installed in more detail. FIGS. 4A and 4B show a side and top cut-through view, respectively, of the manifold 208 design. These views show the hard insulators 402 and titanium housing 404. The divert thruster 206 design is described in more detail below.

Figure 5A:
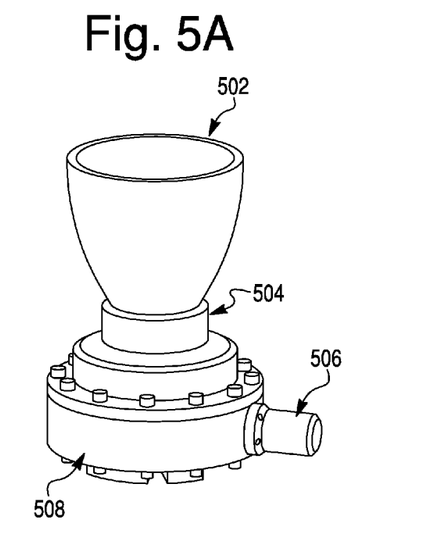
FIGS. 5 to 7 illustrate an example divert thruster for use with the ESDACS in FIG. 2.
Figure 5B:
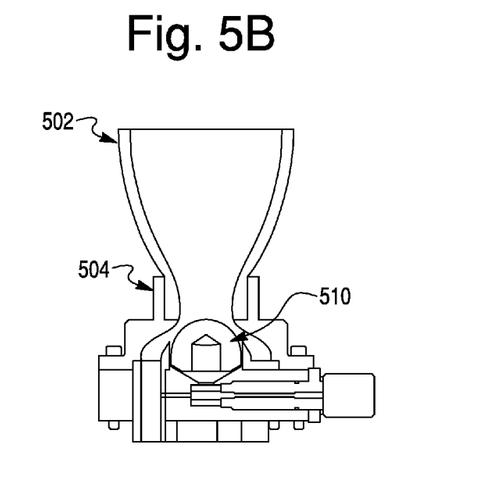

FIGS. 5A and 5B show an example divert thruster 206 in more detail in perspective and side cut-through views, respectively. Thruster 206 preferably includes an On/Off pilot operated valve 506. The main stage valve poppet 510 is preferably located such that when open the divert thruster flow is choked on the natural throat of the thrusters. An advantage of this design is a large nozzle expansion ratio that is sized to a constant 10:1 regardless of the chamber pressure. As further shown, thruster 206 includes a high strength composite nozzle 502, a high temperature metallic housing 504, and an insulated metallic pilot stage housing 508.

Figure 6:
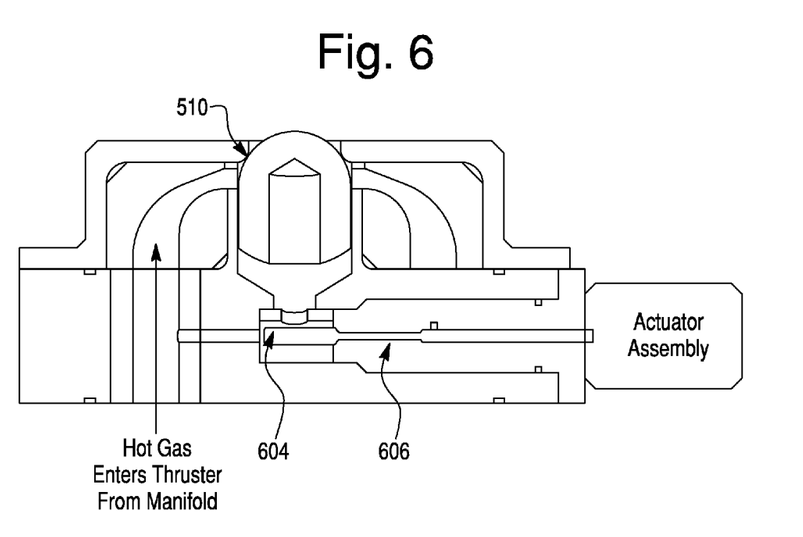

FIG. 6 is an exploded cut-through view showing the divert thruster 206 control features of the pilot operated thruster valve assembly. In this view, the thruster 206 is shown closed, with the main stage poppet 510 on throat. As further shown, pilot stage 604 is open which introduces high pressure propellant gasses to the backside of the main stage to closed main stage poppet 510. As indicated by 606, when the pilot is closed, the backside main stage pressure is vented, through a small bleed hole, and the main stage poppet 510 is opened due to the force imbalance resulting from the backside gas flowing. FIG. 6 also shows how the flow of hot gas enters the thruster from manifold 208.

Figure 7A:
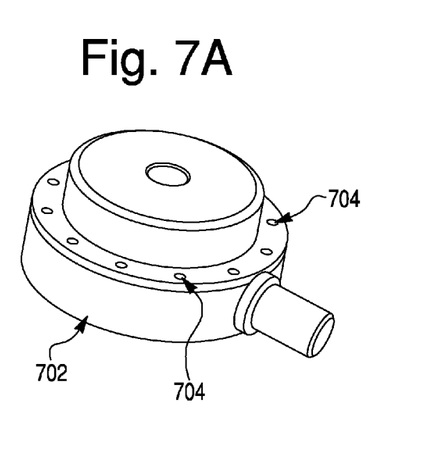
Figure 7B:
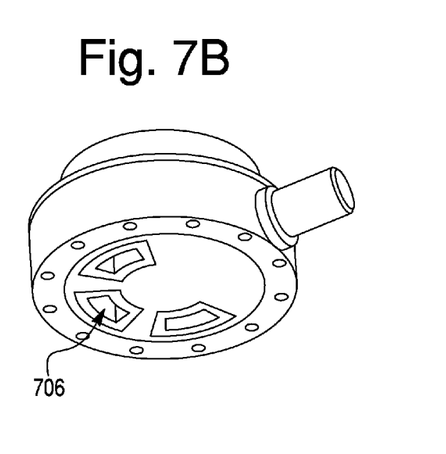

FIGS. 7A and 7B are upper and lower perspective views, respectively, of thruster 206. These show the pilot vent hole 702 that vents the main stage backside main pressure to the ambient outside environment, through holes 704 for bolting the housings to manifold 208, and shaped inlets 706 for hot gas.

Figure 8A:
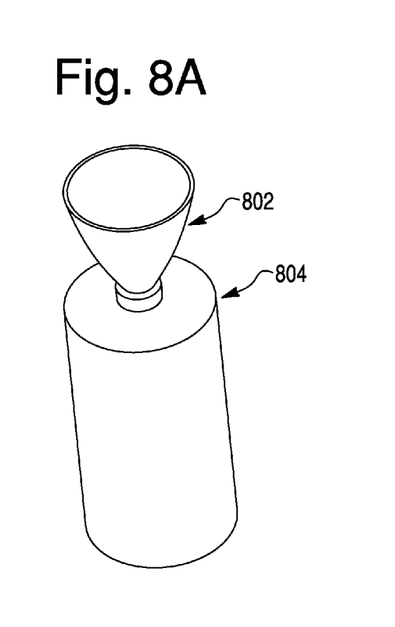
FIGS. 8A and 8B illustrate an example ACS thruster for use with the ESDACS in FIG. 2.
Figure 8B:
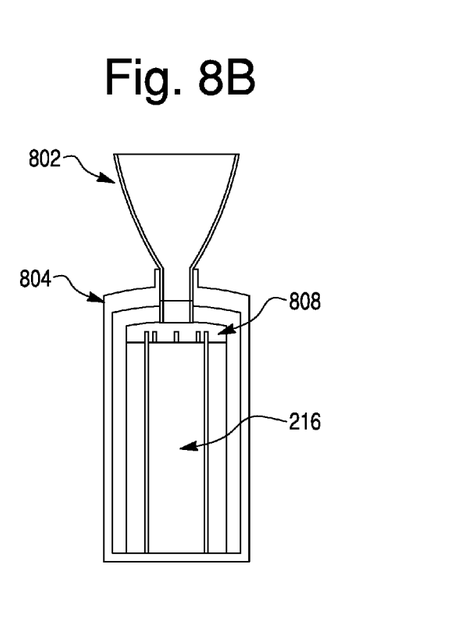

FIGS. 8A and 8B are perspective and side cut-through views of an example high level ACS thruster 202, respectively. As explained above these are stand alone (propellant self-contained) thrusters that are primarily used for divert torque disturbance corrections. The thrusters use conventional rocket motor materials with the addition of ESP propellant 216 and ignition/extinguishment electrodes 808 controlled by the present invention. As further shown, thruster 202 preferably includes a high strength composite nozzle 802 and insulated metallic housing 804.

It is possible to use additional small precision ACS thrusters which can be scaled down versions of the large ACS thrusters. These thrusters can be primarily operated in a pulse width modulation control mode and have a maximum of 200 pulses per thrusters. These thrusters are in addition to the 202 thrusters, and can be used in applications requiring a higher precision, more accurate thrust, thus driving the system to a bi-level ACS solution, as will be described in more detail below.

Figure 9:
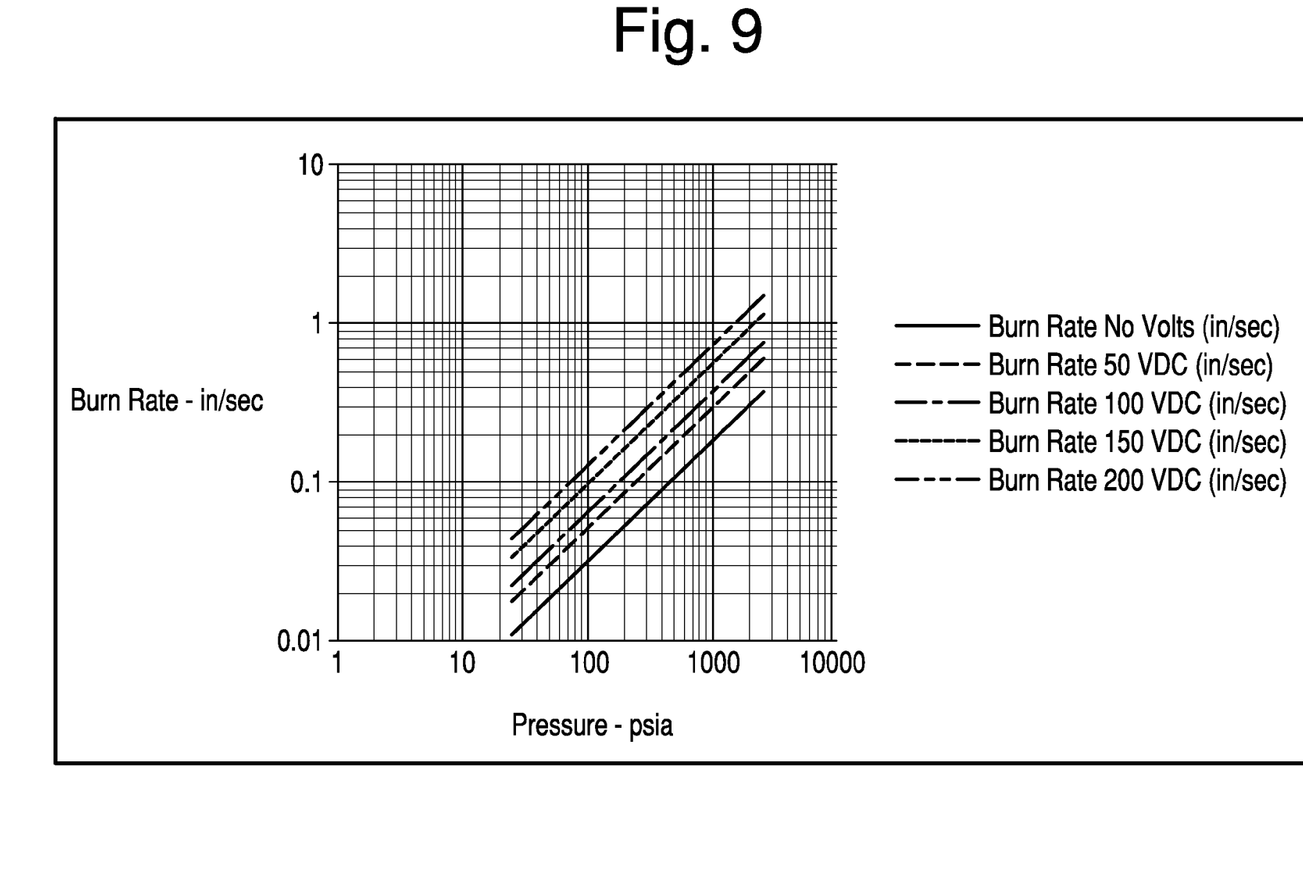
FIG. 9 is a plot showing burn rate curves for an example solid propellant that can be controlled using the principles of the invention.

The ESDACs propellant 216 is, for example, High Performance Electric Propellant (HIPEP) manufactured by the Digital Solid State Propulsion Company (DSSP) in Reno Nev. This propellant has the unique capabilities to be ignited using electric voltage (>150Vdc) and sustain burning when chamber pressure is greater than 200 psia. The burn rate characterization of this propellant is shown in FIG. 9. The relationship between burn rate and applied propellant voltage is called the "Propellant Gain" and is used in the control system algorithm of the invention to control the ESDACS ignition, extinguishment and thrust magnitude.

The control system of the present invention uses such propellant specific information relating to nominal burn rate, no voltage applied, and augmented burn rate with voltage applied. This data can be generated using small burn rate motors after propellant cast and cure to derive the "Propellant Gain" that characterizes the burn rate sensitivity to voltage, and is used in the closed loop control such as 102 in FIG. 1.

More particularly, the present inventor recognizes that mathematically modeling the rocket motor, as used in the control system of the invention, requires a good understanding of the propellant grain burn back profile along with the propellant gain term. In embodiments, the math model is constructed as two separate rocket motors burning into a common chamber. These rocket motors represent the augmented and nominal burn area from a single grain. The augmented burn area is the area that the voltage is applied between the electrodes. The nominal burn area is the area where the burn rate is not affected by the voltage. The grain burn back profile, for the small motor, is assumed to be a cone with the center of the augmented burn area at the negative electrode. The nominal burn area is roughly the lateral surface area of the cone.

Accordingly, chamber pressure PC of a motor can be modeled as:

$$PC = (Rhop*(A1*Ab1 + A2*Ab2)/Cw/At)^{(1(1-N))}$$

Where Rhop is the propellant density, Cw is the propellant flow coefficient (G/Cstar). At is the throat area and N is the propellant slope. The propellant slope is the exponent that the chamber pressure is raised too in the burn arte equation: $A1*PC^{AN}$. This equation further models the chamber pressure as a function of Ab1 (burn area augmented by voltage), A1 (burn rate constant at voltage and pressure), Ab2 (burn area of unaffected grain), A2 (burn rate constant at no voltage), which can be determined from analysis of any given propellant by those skilled in the art, as can be the values of Rhop, C2, At and N.

This equation can be further simplified by combining Rhop, Cw and At into a single constant Kn, and using N=0.7 (as derived from the burn rate curves, for example).

$$PC = (Kn*(A1*Ab1 + A2*Ab2))^{3.33}$$

which can be used by the closed loop control of the present invention, e.g. system 100 in FIG. 1.

Propellant delivered performance is based on using typical preliminary design knock down factors to the one dimensional nozzle expansion performance assessments. The estimated delivered performance for an ESDACS nozzle is 10:1 vacuum operation at 256 sec.

The present inventor performed a thorough propulsion ballistic analyses assessment of the above ESDACS sizing. This assessment was performed using steady state propulsion sizing relationships based on the selected propellant and ESDACS component technologies. The below describes the component and steady state performance/sizing relationships.

Divert Propulsion thruster 206 requirements for the ESDACS are based on example requirements for an agile KV with 20 G acceleration capability in all three axes. With a payload weight of 10.21 Lbf and a total delta-V requirement of 3214 ft/sec the DACS propulsion weight was sized for 28.07 Lbm which yields a total KW weight of 38.28 Lbm. The maximum DACS Divert thrust was then calculated to be 765 Lbf. It should be noted that the ESDACS ballistic sizing uses the ESP HIPEP propellant formulation from Digital Solid State Propulsion Company. The selection of this propellant sized the divert thrusters, propellant cases and propellant manifold in this example embodiment. However, the invention is not limited to this example, and those skilled in the art will understand how to apply the invention to other types of propellants after being taught by this example.

A basic ESDACS design requirement is to size the maximum divert thrust at the maximum operating propellant voltage (Burn Rate). This ensures that, with a constant end burning propellant surface area, the ESDACS can always deliver the max thrust. Through this analysis, the maximum chamber pressure was selected to be at 2000 psia. An additional design driver is that operating pressure is to fall below 200 psia when the applied propellant voltage is removed to ensure propellant extinguishment can be achieved. Due to the high propellant slope characteristic and large 10:1 burn rate augmentation, with voltage, the pressure is estimated to fall well below 200 psia thus meeting this requirement. Due to the embedded electrodes there will be preferential burning that will increase the burn due to thermal heating of the electrodes. This effect is preferably characterized and factored into the burn rate control scheme as required.

For the maximum operating thrust/pressure point a propellant surface area of 40.38 $in^2$ is required. Due to the design goal of minimizing the KV center of gravity shift throughout the propellant burn profile it is necessary to split the propellant into two equal grains. Both propellant grains burn opposite from each other thus maintaining the center of gravity control about the divert plane while burning. The result is 2 grains with a average burn area of 20.2 $in^2$ and 5.1 in diameter. Propellant grain web is 5.26 in per grain. Due to the asymmetry that exists in applying the axial thruster to the KV aft end, the propellant burn profile will not be exactly equal between the two grains. This will present a slight CG imbalance and drive requirements on the ACS thrust level due to increased divert torque disturbances.

The High Level ACS Thrusters 202 are conceptualized to be self contained ESP loaded thrusters that use the control system of the invention to control delivered thrust and impulse. The maximum ACS thrust requirement is sized to meet the 765 max thrust Divert torque achieved with the max estimate CG offset. A 1.5 ACS torque force margin is applied to ensure ACS angular accelerations can be achieved. The resulting maximum ACS thrust is estimated at 6.5 Lbf. Similar ballistic sizing requirements were placed on the ACS thruster with the max thrust being sized with the associated max operating voltage of 150 Vdc.

To calculate the ACS thruster 202 propellant loading, a single ACS thruster was sized to fully counter the Divert torque disturbance during Divert operation. During Divert extinguishment it was estimated that the maximum ACS thrust to the 15% of the divert operation max thruster with a 10% duty cycle. With these assumptions each ACS thruster is sized to have 0.02 Lbm ESP with a web 1.2 in.

The optional small precision ACS thrusters are an application of micro thrusters currently being developed by Digital Solid State Propulsion (DSSP). These thrusters can be modified to provide highly accurate minimum impulse bits with over 200 pulse per thruster. Such thrusters can be circumferentially integrated into the aft ring of the ESDACS and used for precision attitude control during divert pulse coast periods.

The ESDACS 200 operation preferably uses two separate electrical power sources. A 150 to 200 VDC high power battery is used for propellant ignition and throttling operation. A 28 VDC power supply is used to operated the divert and ACS thrusters.

For propellant ignition 1200 watts of power is estimated with the steady state burn rate control requirements of 1600 watts (This includes both grains and all ACS thrusters burn rate control). The 5 Divert thruster power requirements have a maximum of 80 watts required from the 28 VDC voltage source.

Figure 10:
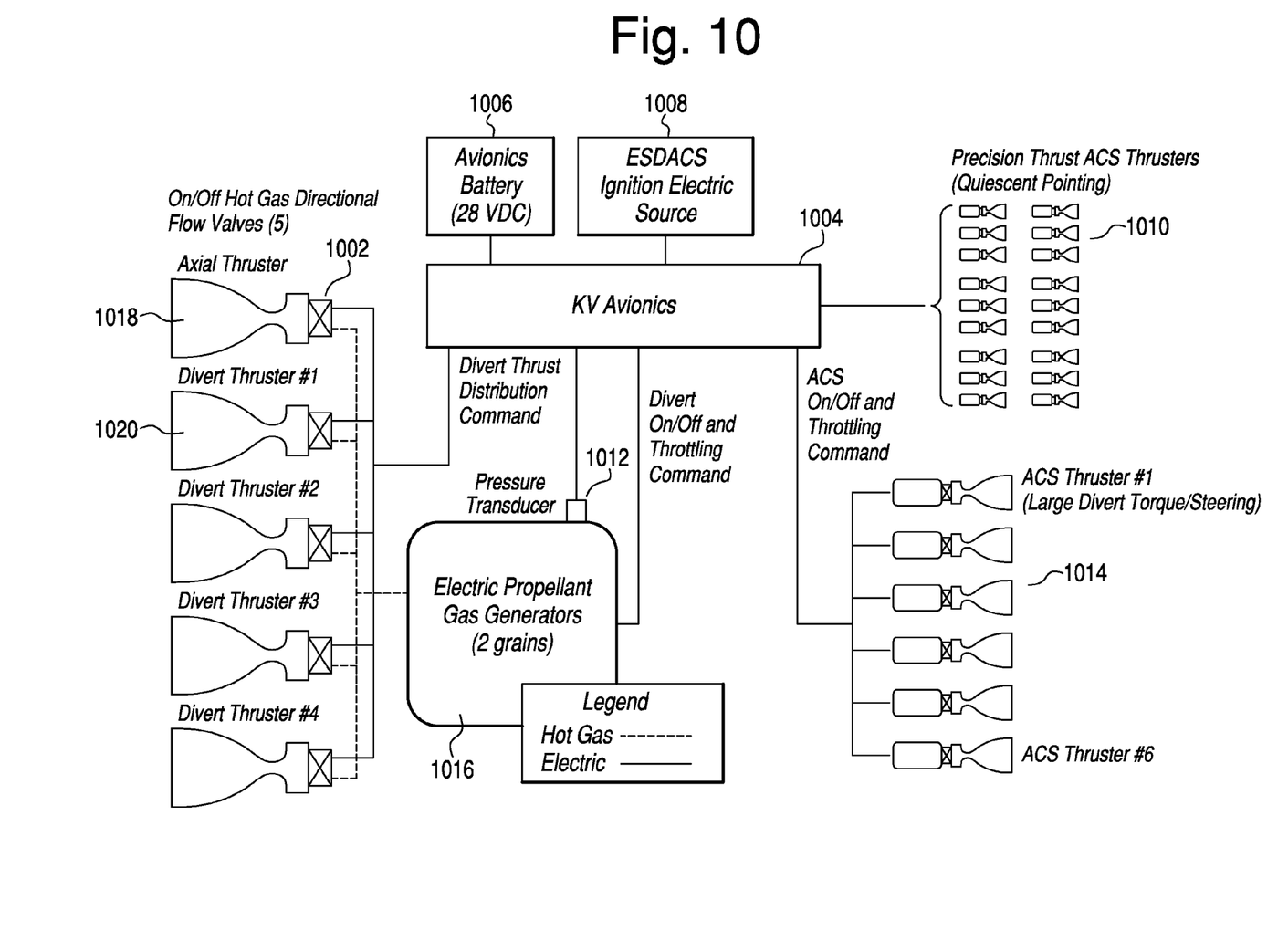
FIG. 10 is a system block diagram of an example ESDACS that incorporates the control system of the present invention.

An example ESDACS 202 system architecture is shown in FIG. 10. The system consists of two Electric Solid Propellant grains 1016 that are controlled via a closed pressure loop (sensed by transducer 1012) that uses the control system technology of the invention for ignition, extinguishment and thrust magnitude control. The propellant hot gases feed a central manifold (e.g. manifold 208, not shown) that houses four on/off divert thrusters 1020 and one axial thruster 1018.

The system further includes a combination of high and low level ACS thrusters. The 6 high level ACS thrusters 1014 are self contained ESP loaded thrusters that primarily operate during KV divert cycles and correct for large divert torque disturbances. The small precision ACS thrusters 1010 are sized to provide a fine pointing capability for long distance accurate pointing of the KV as well as providing ACS during divert coast periods.

Due to the simplified architecture it is envisioned that the ESDACS control is conducted through the Kill Vehicle avionics package 1004. The avionic commands all the ESDAC functions including ignition, extinguishment, thrust level, Divert thrusters 1020 and ACS thrusters 1010, 1014. The propellant control algorithms of the present invention can be embedded in a stand-alone microprocessor assembly or embedded in the KV avionics 1004 via embedded software executing on a CPU within the avionics.

An example operation of the control system of the invention with ESDACS 200 will now be described in connection with the embodiment shown in FIG. 10. During Divert pulse ignition events, the five onloff thrusters 1018, 1020 are commanded closed via valves 1002 and electricity is applied to the propellant 1016 via embedded electrodes. With the electricity applied the propellant ignition is achieved and the chamber starts pressurizing. When the chamber pressure reaches the commanded pressure (as sensed by 1012), a single divert thruster 1020 is opened to provided the divert impulse.

During the divert pulse event, chamber pressure is sensed by transducer 1012 and controlled via the control algorithm of the invention that uses a closed loop pressure system and variable commanded voltage to maintain the burn rate associated with the commanded pressure. During the divert pulse a high level ACS thrust is required to counter an inherent thrust torque offset. This torque requirement is derived by the maximum Center of Gravity and divert thruster vector error that the KV experiences during flight. These high-level ACS thrusters 1014 are self contained ESP rocket motors that are controlled by the invention and each has an independent self contained propellant charge. Operation of these thrusters is similar to the operation of the Divert pulsing described herein.

After the divert pulse, a controlled extinguishment event is commanded by the techniques of the invention. First, the opposite thruster is commanded open to null the delivered divert thrust. This event will naturally start the de-pressurization of the chamber. Simultaneous with the thruster opening command the electric voltage is removed from the propellant grain 1016. The result is a de-pressurization of the chamber to a level that cannot sustain combustion and extinguishment occurs.

During divert thrust coast periods the KV attitude is controlled via combination of the small precision ACS thrusters 1010 and large ACS thrusters 1014. In embodiments, the precision ACS thrusters 1010 are useful during coast to accurately point the KV for early target acquisition and/or discrimination. These thrusters can provide up to 200 very small impulse bit at thrust level <0.01 Lbf.

Although the propellant control system of the invention has been described above in connection with a useful application in ESDACS, the invention is extremely versatile in its application to future controllable rocket motor systems, and so is not limited to this application. Instead, the technology, as described above, is applicable for thrust control applications where multiple thrusters are fed from a common chamber. The algorithm is also applicable to single thruster rocket motor applications where throttleability is required from impulse and/or thrust control is required. The ACS subsystem described above documented controllability of a single thruster system. Other potential future controllable rocket motor applications of the propellant control system of the invention includes: Divert and Attitude Control Systems; Tactical Air-to-Air Missile Rocket Motors for Proportional Thrust Boost/Sustain; Control or Thrust Pulse Control; Tactical Ground to Air Missiles Rocket Motors for Proportional Thrust Boost/Sustain Control or Thrust Pulse Control; Tactical Air to ground missiles Rocket Motors for Proportional Thrust Boost/Sustain Control or Thrust Pulse Control; Upper Stage Defense boosters Rocket Motors for Proportional Thrust Boost/Sustain Control or Thrust Pulse Control; Missile attitude control systems Rocket Motors for Proportional Thrust Boost/Sustain Control or Thrust Pulse Control; Space Transport Systems Rocket Motors for Proportional Thrust Boost/Sustain Control or Thrust Pulse Control; and Advanced Munition Thrust Control.

Moreover, the invention is not limited to rocket motors and munitions applications. For example, the control system of the invention is also applicable to the following fields: Oil Field Services (i.e. Oil well stimulation using controlled explosions); Homeland Recue Devices (e.g. Jaws of life type devices using P-Con controlled gas generation; Disaster area debris removaUsafing for rescue teams, i.e. controlled extension braces to secure buildings/debris for first responders); Fire suppressant delivery system: controlled gas generation to throttle suppressant delivery substance; Military/Civilian controlled gun bullets (Smart bullet) and projectiles; and Automobile safety devices (i.e. air bag deployment and seat belt restraints).

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
   receiving a thrust command;
   controlling electrical power provided to a solid propellant to cause the solid propellant to output a thrust corresponding to the thrust command;
   monitoring a chamber pressure corresponding to the thrust output; and
   adjusting the electrical power in accordance with the monitored chamber pressure.

2. A method according to claim 1, wherein the solid propellant is an electric solid propellant comprising electrodes embedded therein, and the electrical power is provided to the electrodes.

3. A method according to claim 1, wherein the electrical power is controlled in accordance with a propellant gain determined as a function of burn rate and applied voltage for the solid propellant.

4. A method according to claim 2, wherein the electrical power is controlled in accordance with a propellant gain determined as a function of burn rate and applied voltage for the solid propellant.

5. A system comprising:
   a thrust command input;
   a control loop that adjusts electrical power provided to a solid propellant to cause the solid propellant to output a thrust corresponding to the thrust command; and
   a pressure transducer that monitors a chamber pressure corresponding to the thrust output;
   wherein the control loop is adapted to adjust the electrical power in accordance with the monitored chamber pressure.

6. A system according to claim 5, wherein the solid propellant is an electric solid propellant comprising electrodes embedded therein, and the electrical power is provided to the electrodes.

7. A system according to claim 5, wherein the control loop is adapted to adjust the electrical power in accordance with a propellant gain determined as a function of burn rate and applied voltage for the solid propellant.

8. A system according to claim 6, wherein the control loop is adapted to adjust the electrical power in accordance with a propellant gain determined as a function of burn rate and applied voltage for the solid propellant.

9. A rocket motor comprising:

a solid propellant; a thrust command input;

a controller programmed to adjusts electrical power provided to the solid propellant to cause the solid propellant to output a thrust corresponding to the thrust command; and a pressure transducer that monitors a chamber pressure corresponding to the thrust output;

wherein the controller is programmed to adjust the electrical power in accordance with the monitored chamber pressure.

10. A rocket motor according to claim 9, wherein the solid propellant is an electric solid propellant comprising electrodes embedded therein, and the electrical power is provided to the electrodes.

11. A rocket motor according to claim 9, wherein the controller is programmed to adjust the electrical power in accordance with a propellant gain determined as a function of burn rate and applied voltage for the solid propellant.

12. A rocket motor according to claim 9, wherein the controller comprises embedded software executing in a processor housed in the rocket motor.

* * * * *